United States Patent
Kim

(10) Patent No.: US 9,389,644 B2
(45) Date of Patent: Jul. 12, 2016

(54) DOCKING APPARATUS FOR PORTABLE ELECTRONIC DEVICE

(71) Applicant: SAMSUNG Electronics Co., Ltd., Suwon-si, Gyeonggi-do (KR)

(72) Inventor: Hae-soo Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 137 days.

(21) Appl. No.: 14/472,675

(22) Filed: Aug. 29, 2014

(65) Prior Publication Data

US 2015/0092333 A1    Apr. 2, 2015

(30) Foreign Application Priority Data

Sep. 30, 2013    (KR) .................. 10-2013-0115909

(51) Int. Cl.
*G06F 1/16*    (2006.01)
*G06F 13/00*    (2006.01)

(52) U.S. Cl.
CPC ............ *G06F 1/1654* (2013.01); *G06F 1/1632* (2013.01); *G06F 1/1669* (2013.01)

(58) Field of Classification Search
CPC .............................. G06F 1/1632; G06F 1/1654
USPC ........... 361/679.41–679.45, 679.29; 710/303, 710/304
See application file for complete search history.

(56) References Cited

U.S. PATENT DOCUMENTS

| 9,146,586 | B2 * | 9/2015 | Ho | G06F 1/1616 |
| 9,223,356 | B2 * | 12/2015 | Chuang | G06F 1/1626 |
| 9,268,369 | B2 * | 2/2016 | Hirai | G06F 1/1654 |
| 2010/0246119 | A1 | 9/2010 | Collopy et al. | |
| 2013/0259564 | A1 * | 10/2013 | Lin | H01R 13/42 403/327 |
| 2013/0321994 | A1 * | 12/2013 | Yuan | H05K 7/00 361/679.01 |
| 2014/0133080 | A1 * | 5/2014 | Hwang | G06F 1/1632 361/679.17 |
| 2014/0193193 | A1 * | 7/2014 | Wikander | G06F 1/1616 403/322.1 |
| 2014/0340840 | A1 * | 11/2014 | Han | G06F 1/1632 361/679.43 |
| 2014/0355210 | A1 * | 12/2014 | Hashimoto | G06F 1/1679 361/679.58 |
| 2014/0376181 | A1 * | 12/2014 | Zhang | E05B 47/026 361/679.55 |

FOREIGN PATENT DOCUMENTS

KR    20010019495    3/2001

* cited by examiner

*Primary Examiner* — Nidhi Thaker
(74) *Attorney, Agent, or Firm* — Staas & Halsey LLP

(57) ABSTRACT

A docking apparatus usable with a portable electronic device includes a locking member configured to be moved between a first position in which the portable electronic device docked to the docking apparatus is locked and a second position in which the locking of the portable electronic device is released, a locking member driving unit configured to drive the locking member, and a controller configured to control the locking member driving unit so that, if an unlocking condition is satisfied in a state in which the portable electronic device is docked to the docking apparatus, the locking member is moved from the first position to the second position and then the locking member is maintained in the second position for at least a predetermined time.

21 Claims, 15 Drawing Sheets

DOCKING APPARATUS FOR PORTABLE ELECTRONIC DEVICE

CROSS-REFERENCE TO RELATED APPLICATIONS

This application claims the benefit of priority under 35 U.S.C. §119(a) from Korean Patent Application No. 10-2013-0115909 filed Sep. 30, 2013 in the Korean Intellectual Property Office, the disclosure of which is incorporated herein by reference in its entirety.

BACKGROUND OF THE INVENTION

1. Field of the Invention

The present disclosure relates to a docking apparatus for a portable electronic device. More particularly, the present disclosure relates to a one hand detachable docking apparatus for a portable electronic device.

2. Description of the Related Art

A demand for portable electronic devices, such as a tablet computer that a display unit and a computing unit are integrated into a single apparatus, etc., has increased due to advantages such as portability, light weight, etc.

These portable electronic devices can be used independently without being connected to other auxiliary devices. For such an independent use, the display unit of the portable electronic device is generally implemented as a touch screen. However, for more convenient data input and document creation, the portable electronic device may also be connected to a docking apparatus that supports an input function.

The docking apparatus may be provided with a locking member configured to allow the docked portable electronic device to be locked and an unlocking button configured to move the locking member to an unlocking position. In this case, a user can separate the portable electronic device from the docking apparatus in a manner that one hand of the user removes the portable electronic device from the docking apparatus while the other hand of the user presses the unlocking button.

Thus, a user has to use both hands for separation of the portable electronic device.

SUMMARY OF THE INVENTION

The present disclosure provides a one-hand detachable docking apparatus for a portable electronic device.

Additional features and utilities of the present general inventive concept will be set forth in part in the description which follows and, in part, will be obvious from the description, or may be learned by practice of the general inventive concept.

The above and/or other features and utilities of the present disclosure can substantially be achieved by providing a docking apparatus for a portable electronic device, which may include a locking member configured to move between a first position in which the portable electronic device docked to the docking apparatus is locked and a second position in which the locking of the portable electronic device is released, a locking member driving unit configured to drive the locking member, and a controller configured to control the locking member driving unit such that, if an unlocking condition is satisfied in a state in which the portable electronic device is docked to the docking apparatus, the locking member moves from the first position to the second position and then the locking member is maintained in the second position for at least a predetermined time.

The controller may control the locking member driving unit so that, if a locking condition is satisfied more than the predetermined time in a state in which the portable electronic device is docked to the docking apparatus, the locking member is moved from the second position to the first position.

The docking apparatus may include a first signal generating member configured to generate a locking signal by detecting docking of the portable electronic device; and a second signal generating member configured to generate an unlocking signal by detecting an operation of a user or a touch of the user, wherein, if both the locking signal and the unlocking signal are received, the unlocking condition is satisfied, and, if the locking signal is received but the unlocking signal is not received, the locking condition is satisfied.

The locking member driving unit may include an electromagnet coupled to the locking member; a first permanent magnet disposed so that one pole of the first permanent magnet faces one end of the electromagnet; and a second permanent magnet disposed so that one pole of the second permanent magnet faces other end of the electromagnet, wherein the pole of the first permanent magnet facing the one end of the electromagnet and the pole of the second permanent magnet facing the other end of the electromagnet have the same polarity.

When the electromagnet is attached to the first permanent magnet, the locking member may be placed in the first position, and when the electromagnet is attached to the second permanent magnet, the locking member may be placed in the second position.

When a forward current flows, the electromagnet may be moved from the second permanent magnet to the first permanent magnet, and when a reverse current flows, the electromagnet may be moved from the first permanent magnet to the second permanent magnet.

After movement of the electromagnet is completed, the controller may block a current supply to the electromagnet.

The first signal generating member may include a button switch that is operated by pressure of the portable electronic device to be docked or an approach detection sensor to detect approach of the portable electronic device to be docked.

The second signal generating member may include a button switch that is operated by manipulation of a user or a touch sensor to detect a touch of the user.

The docking apparatus may include a main body having a plurality of input keys; and a docking unit connected to a top end portion of the main body and comprising a docking groove in which a bottom end of the portable electronic device is inserted.

The first signal generating member may be provided in the docking groove, and the second signal generating member may be provided in the main body.

One of the plurality of input keys may be used as the second signal generating member.

The docking unit may be rotatably connected to the main body.

The locking member and the locking member driving unit may be disposed in the docking unit.

The locking member may include a body portion slidably disposed within the docking unit; and at least one locking protrusion vertically extending from the body portion.

The docking unit may include a pushing member insert hole into which a pushing member configured to push the locking member from the first position to the second position is inserted from an outside.

The above and/or other features and utilities of the present disclosure can substantially be achieved by providing a docking unit usable with a portable electronic device, the docking unit including a locking member disposed to lock and unlock the portable electronic device, a first signal generating member to generate a first signal according to a movement of the portable electronic device with respect to the locking unit; and a locking member driving unit connected to the locking member to drive the locking member to an locking position according to the first signal of the first signal generating member, and to drive the locking member to an unlocking position according to a manipulation of an external member.

The external member may include one of a mechanical member usable to move the locking member when a power is not supplied to the locking member driving unit and an electrical member usable to move the locking member when a power is supplied to the locking member driving unit.

The locking member driving unit may include a portion connected to the locking member such that the locking member and the portion of the locking member driving unit move together between the locking position and the unlocking position.

The docking unit may further include a housing to accommodate the locking member and the first signal generating member between upper and lower sides thereof, the housing including a plurality of openings formed on the upper side to expose protrusions of the locking member and the first signal generating member toward the portable electronic device to be disposed on the upper side.

The upper side of the housing may have a shape to correspond to a lower side and a corner side of the portable electronic device.

The above and/or other features and utilities of the present disclosure can substantially be achieved by providing a docking apparatus usable with a portable electronic device. The docking apparatus may include a main body having one or more input keys, and a docking unit usable with a portable electronic device. The docking unit may include a locking member disposed to lock and unlock the portable electronic device, a first signal generating member to generate a first signal according to a movement of the portable electronic device with respect to the locking unit; and a locking member driving unit connected to the locking member to drive the locking member to an locking position according to the first signal of the first signal generating member, and to drive the locking member to an unlocking position according to a manipulation of an external member disposed on one of the main body and the portable electronic device.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
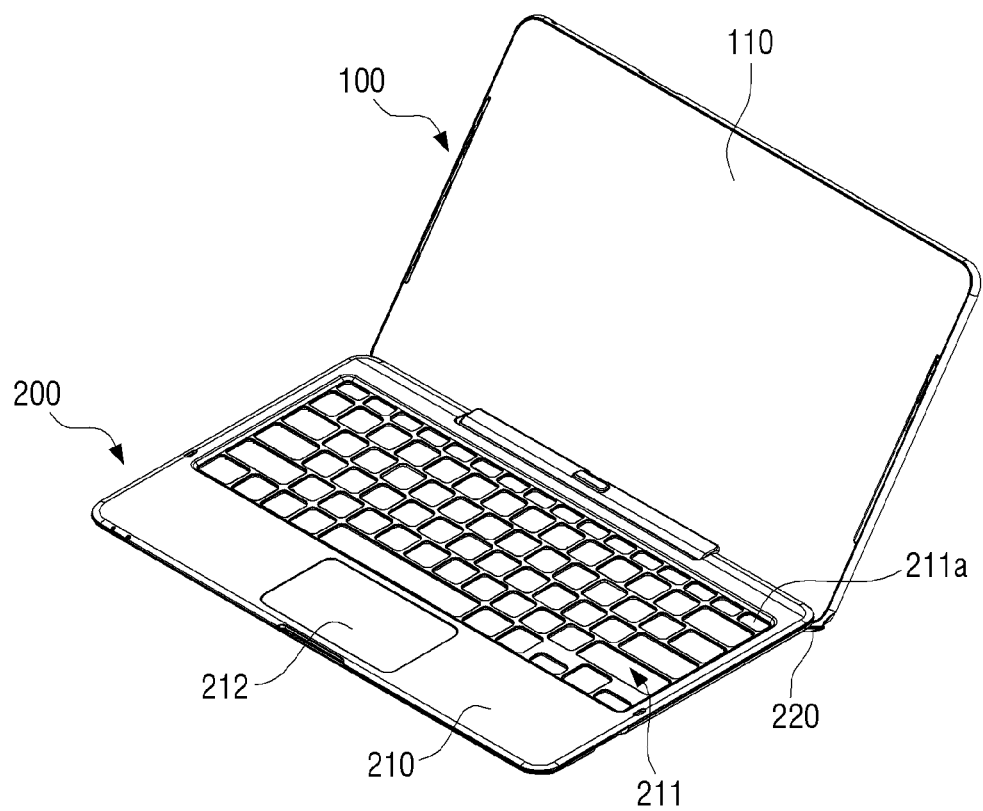
FIG. 1 is a perspective view illustrating a docking apparatus and a portable electronic device docked to the docking apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
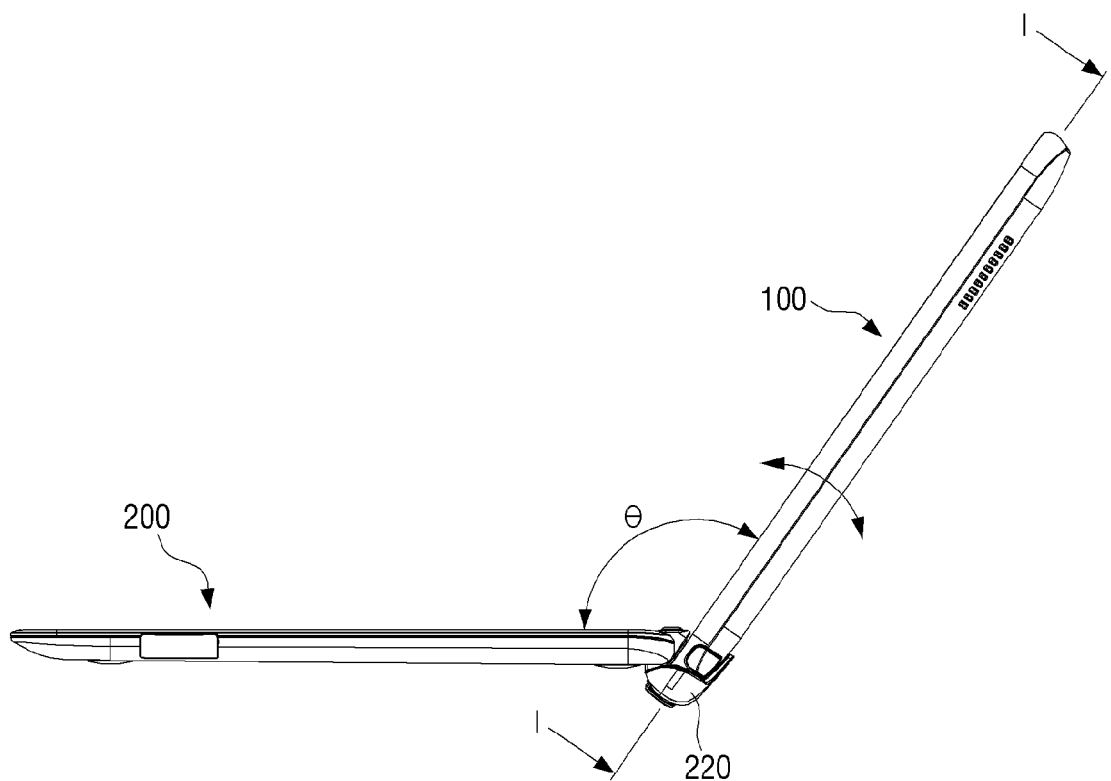
FIG. 2 is a side view of the docking apparatus and the portable electronic device of FIG. 1.
Figure 3:
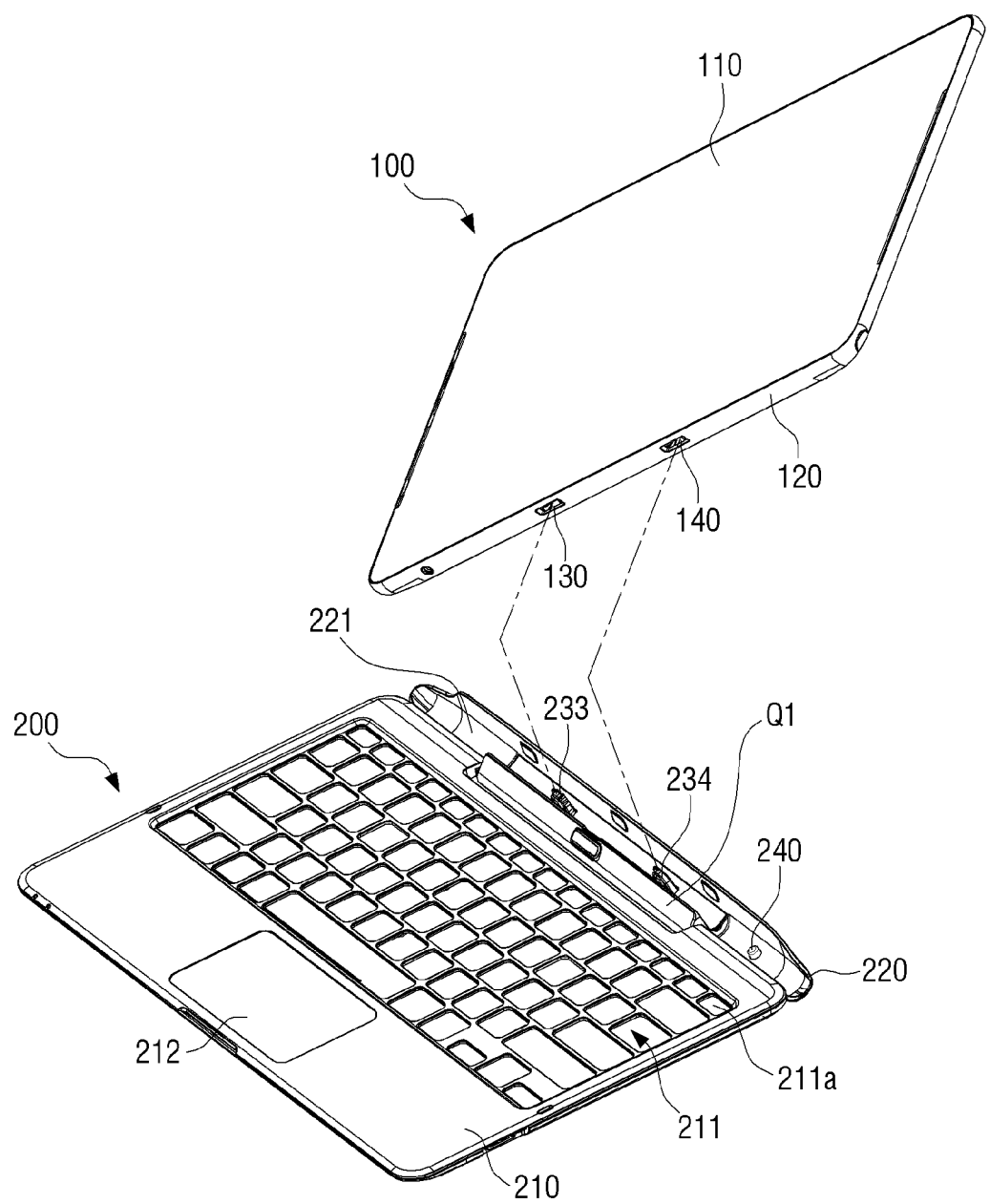
FIG. 3 is a perspective view illustrating the docking apparatus and the portable electronic device of FIG. 1 separated from each other.
Figure 4A:
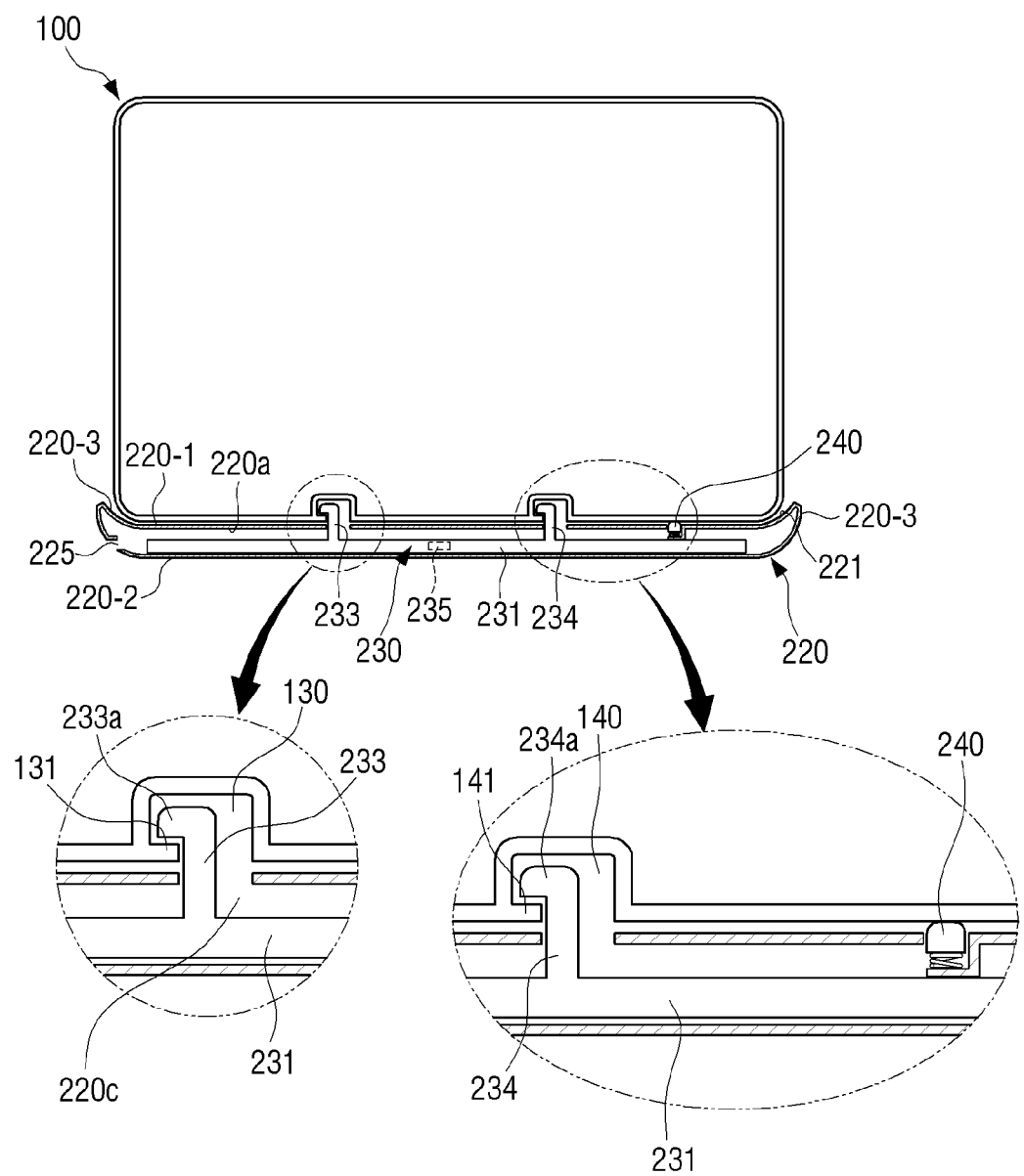
FIG. 4A is a sectional view taken along a line I-I of FIG. 2 when the portable electronic device is locked by a locking member.
Figure 4B:
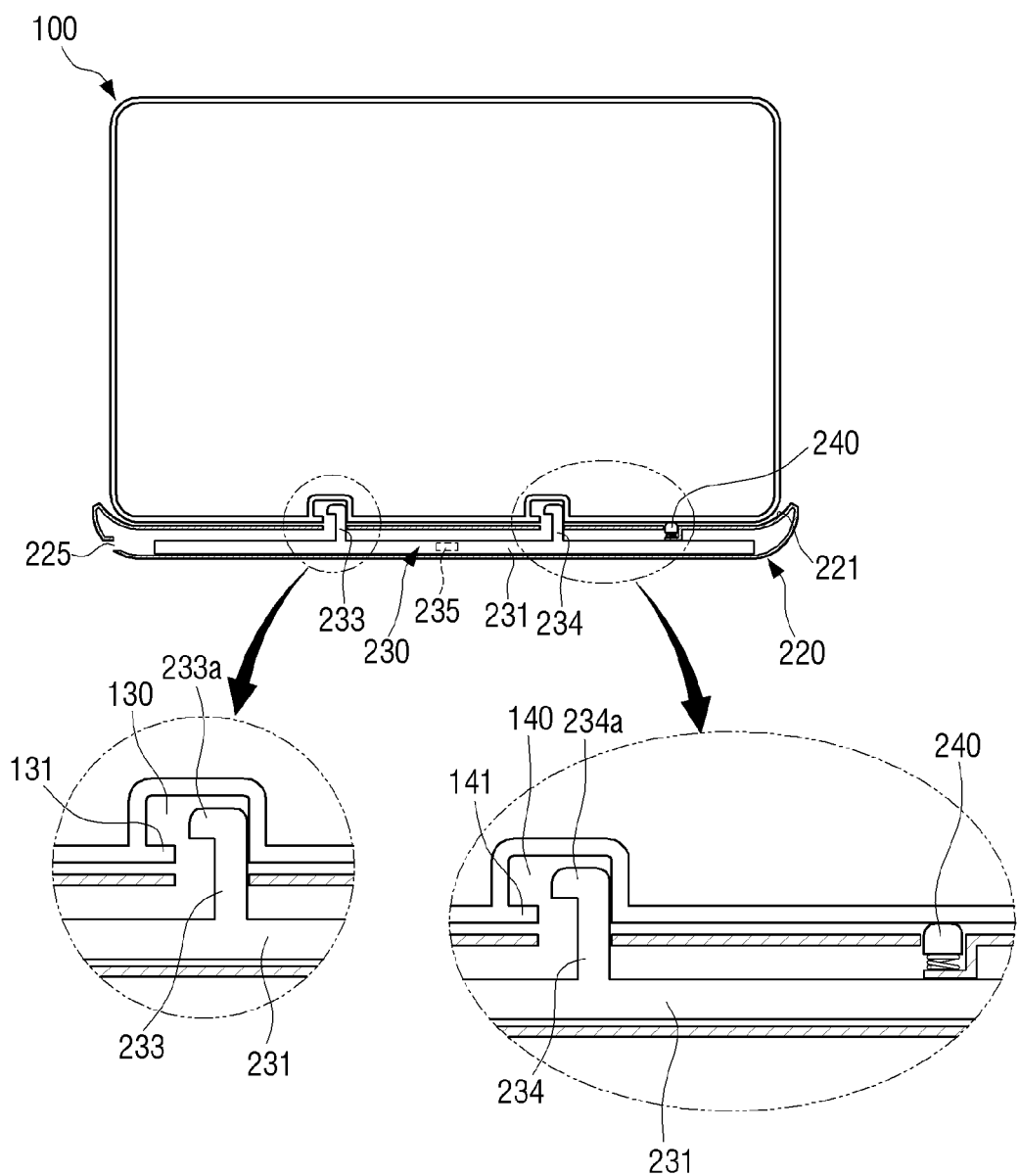
FIG. 4B is a sectional view taken along a line I-I of FIG. 2 when locking of a portable electronic device is unlocked.

FIG. 1 is a perspective view illustrating a docking apparatus 200 and a portable electronic device 100 docked to the docking apparatus 200 according to an embodiment of the present general inventive concept, and FIG. 2 is a side view of the docking apparatus 200 and the portable electronic device 100 of FIG. 1. FIG. 3 is a perspective view illustrating the docking apparatus 200 and the portable electronic device 100 of FIG. 1 separated from each other. FIG. 4A is a sectional view taken along a line I-I of FIG. 2 when the portable electronic device 100 is locked by a locking member 230, and FIG. 4B is a sectional view taken along a line I-I of FIG. 2 when the portable electronic device 100 is unlocked.

Referring to FIGS. 1 to 4B, the portable electronic device 100 may be, for example, a tablet computer. The portable electronic device 100 may include a touch screen 110 configured to display images and a computing system (not illustrated) configured to perform calculation and computing, process and storage of data, and communication with other devices according to a wired or wireless method. Accordingly, the portable electronic device 100 may independently perform image displays and computing tasks even without any support from other devices. In the present disclosure, the portable electronic device 100 is illustrated as a tablet computer. However, alternatively, the portable electronic device 100 may be another type of a portable electronic device having both the computing system and the image display unit.

As illustrated in FIGS. 3 and 4A, two locking grooves 130 and 140 are formed on a lower edge surface 120 of the portable electronic device 100. A first locking groove 130 is equipped with a first engaging protrusion 131, and a second locking groove 140 is equipped with a second engaging protrusion 141.

The portable electronic device 100 may be used in a state in which it is separated from the docking apparatus 200 as illustrated in FIG. 3, or may be used in a state in which it is docked to the docking apparatus 200 as illustrated in FIG. 1.

The docking apparatus 200 may include a main body 210, a docking unit 220, and a locking member 230.

Referring to FIGS. 1 to 3, the main body 210 may have the form of a conventional keyboard device. Accordingly, the main body 210 is provided with a plurality of input keys 211 implemented as button-type switches and a touch pad 212 to perform the functions of a mouse on a top surface of the main body 210. When the portable electronic device 100 is docked to the docking apparatus 200, a user may conveniently perform tasks such as data input, document creation, etc. using the input keys 211 and the touch pad 212.

Referring to FIGS. 1 to 3, the docking unit 220 is a mechanical and/or electrical unit to which the portable electronic device 100 is docked. The docking unit 220 may be rotatably connected to a top end portion of the main body 210. Accordingly, an angle θ (see FIG. 2) between the docked portable electronic device 100 and the main body 210 may be variously set depending on a user selection or preference. A connection structure between the main body 210 and the docking unit 220 may be the same as or similar to a connection structure of a main body and a display unit of a conventional notebook computer. Since the connection structure is well known, detail descriptions thereof will be omitted. As illustrated in FIG. 3, the docking unit 220 may include a docking groove 221 into which a bottom end of the portable electronic device 100 is inserted. The docking unit 220 may have a first portion connected to the main body 210, a second portion rotatably connected to the first portion, and a third portion extended from the second portion to receive a bottom portion of the portable electronic device 100. It is possible that the first portion may be a portion of the main body 210. It is also possible that the second portion and the third portion can be formed as a single integrated element. The portable electronic device 100 may communicate with the docking apparatus 200 using a wired or wireless method.

Referring to FIGS. 4A and 4B, the locking member 230 is mounted in the docking unit 220 of the docking apparatus 200. The locking member 230 may include a body portion 231 which is disposed to slide in a lateral direction within the docking unit 220, and first and second locking protrusions 233 and 234 vertically projecting from the body portion 231. The first and second locking protrusions 233 and 234 are formed with end portions (or bent portions) 233a and 234a, respectively. When the portable electronic device 100 is docked to the docking apparatus 200, the first locking protrusion 233 and the second locking protrusion 234 are inserted into the first locking groove 130 and second locking groove 140 of the portable electronic device 100, respectively. In the present embodiment, two locking protrusions 233 and 234 are provided. However, alternatively, the number of the locking protrusion may be changed to one, three, etc. The docking unit 220 may have a housing to accommodate the locking member 230 and the first signal generating member 240 between upper and lower sides 220-1 and 202-2 thereof. The upper side 220-1 of the housing may be formed to correspond to a shape of a bottom portion of the portable electronic device 100, and the housing may have side portions 220-3 to correspond to a corner portion of the portable electronic device 100. The docking unit 220 also has one or more openings 220c such that the first and second locking protrusions 233 and 234 project through and slidably move in the corresponding openings 220c according to a lateral movement of the body portion 231 in the housing of the docking unit 220.

As illustrated in FIG. 4A, the locking member 230 may be placed at a first position at which the docked portable electronic device 100 is allowed to be locked. When the locking member 230 is placed at the first position, the end portions 233a and 234a of the locking protrusions 233 and 234 of the locking member 230 are caught by the engaging protrusions 131 and 141 of the portable electronic device 100, respectively, so that locking of the portable electronic device 100 is achieved.

As illustrated in FIG. 4B, the locking member 230 may be placed at a second position at which the locking of the docked portable electronic device 100 is released. When the locking member 230 is placed at the second position, the catching between the locking protrusions 233 and 234 of the locking member 230 and the engaging protrusions 131 and 141 of the portable electronic device 100 is released so that the portable electronic device 100 is unlocked.

Referring to FIG. 3, a first signal generating member 240 is provided in the docking groove 221 of the docking apparatus 200. In the present embodiment, the first signal generating member 240 may be implemented as a button switch that is pressurized and operated by the portable electronic device 100 being docked. Alternatively, the first signal generating member 240 may be implemented as an approach detection sensor that can detect the approach of the portable electronic device 100 being docked.

When the portable electronic device 100 is docked to the docking apparatus 200, the first signal generating member 240 generates a locking signal S1 by detecting the docking of the portable electronic device 100. Based on the locking signal S1, the locking member 230 is moved from the second position (an unlocking position) to the first position (a locking position).

Referring to FIG. 3, a second signal generating member 211a may be provided in the main body 210 of the docking apparatus 200. In the present embodiment, any one of the plurality of input keys 211 having the form of button switches may be used as the second signal generating member 211a. In this case, the second signal generating member 211a is operated by a pressing operation of the user. Alternatively, the second signal generating member 211a may be implemented as a button switch that is added in the docking apparatus 200 separately from the plurality of input keys 211 or may be implemented in the form of a touch sensor to detect grasping of the user in the portable electronic device 100. When the second signal generating member 211a is implemented in the form of a touch sensor, the second signal generating member 211a may be disposed in a portion (e.g., a right side or a left side of a rear surface) of the portable electronic device 100 or the docking apparatus 200 such that a hand of the user can contact when the user grips the portable electronic device 100. It is also possible that the second signal generating member 211a may be provided in the portable electronic device 100 as a button formed on a housing of the portable electronic device 100 or a portion of a touch screen 110 of the portable electronic device 100 so that a user hand holding the portable electronic device 100 can be detected or touched by a portion of the user hand.

When the user manipulates the second signal generating member 211a to be operated, the second signal generating member 211a generates an unlocking signal S2, and the locking member 230 is moved from the first position (the locking position) to the second position (the unlocking position) based on the unlocking signal S2. After the locking member 230 is moved, the user can separate the portable electronic device 100 from the docking apparatus 200.

Referring to FIGS. 4A and 4B, a pushing member insert hole 225 is formed in the docking unit 220 of the docking apparatus 200. If the power of the docking apparatus 200 is turned off in a state in which the portable electronic device 100 is docked to the docking apparatus 200, after the user inserts a pushing member (not illustrated) into the pushing member insert hole 225 so that the locking member 230 is forcibly pushed from the first position (the locking position) to the second position (the unlocking position), the user may separate the portable electronic device 100 from the docking apparatus 200. Here, a long rod-shaped object (e.g., chopsticks, a ball-point pen core) may be used as the pushing member. The pushing member may have a structure (not illustrated) to be attached to a portion (not illustrated) of a housing of the docking unit 220 when being not used, and may be detached from the portion of the housing of the docking unit 220 when being used. It is possible that the pushing member is formed as a push button (not illustrated) movably disposed on the docking unit 220 between an original position and a pushing position such that when a user pushes the push button from the original position to the pushing position with respect to a housing of the docking unit 220, the push button controls the locking member 230 to move from the first position (locking position) to the second position (unlock position). When the user releases the push button, the push button moves from the pushing position to the original position.

Figure 5:
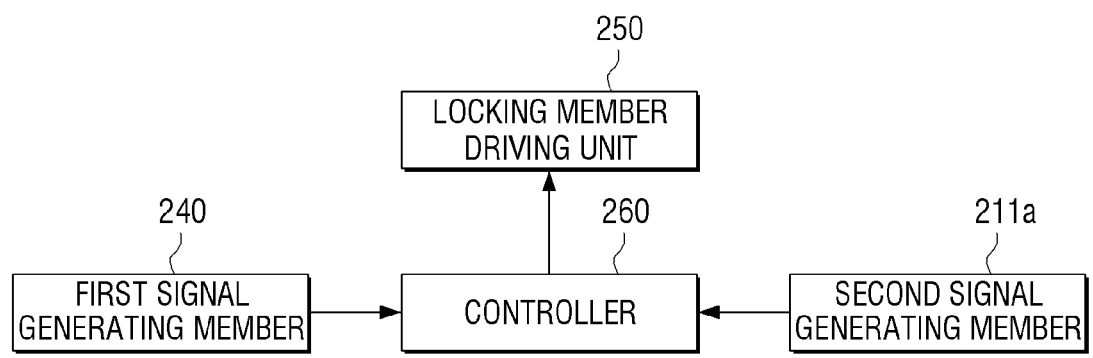
FIG. 5 is a block diagram illustrating a configuration of a locking apparatus that is related to an operation of the locking member as illustrated in FIG. 4A.
Figure 6A:
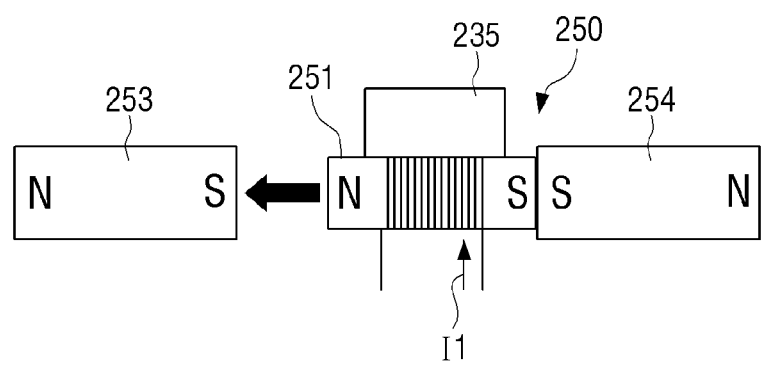
FIG. 6A is a view schematically illustrating a driving unit to drive the locking member as illustrated in FIG. 4A when the driving unit moves the locking member from a second position (an unlocking position) to a first position (a locking position)

FIG. 5 is a block diagram illustrating a configuration of a locking apparatus that is related to an operation of the locking member 230 of FIGS. 4A and 4B. FIG. 6A is a view schematically illustrating a driving unit to drive the locking member 230 of FIG. 4A when the driving unit moves the locking member from a second position (an unlocking position) to a first position (a locking position), and FIG. 6B is a view schematically illustrating a driving unit to drive the locking member 230 of FIG. 4B when the driving unit moves the locking member from a first position (a locking position) to a second position (an unlocking position).

Referring to FIG. 5, the docking apparatus 200 may include a locking member driving unit 250 and a controller 260 to control an operation of the locking member 230. The locking member driving unit 250 is mounted to the docking unit 220 of the docking apparatus 200 to drive the locking member 230 so that the locking member 230 is moved from the first position (the locking position) to the second position (the unlocking position) or from the second position to the first position. The controller 260 controls the locking member driving unit 250 based on the locking signal S1 and the unlocking signal S2 that are received from the first and second signal generating members 240 and 211a. The controller 260 may be disposed in the main body 210 to be electrically connected to the locking member driving unit 250 and the first signal generating member 240. It is possible that the controller 260 may be disposed in the docking unit 220 to be electrically connected to a circuit of the main body 210. It is also possible that the controller 260 may be disposed in the portable electronic device 100 to be electrically connected to the locking member driving unit 250, the first signal generating member 240, and/or a power source (not illustrated) to supply current to the first signal generating member 240 through a wired or wireless communication element (not illustrated).

Figure 6B:
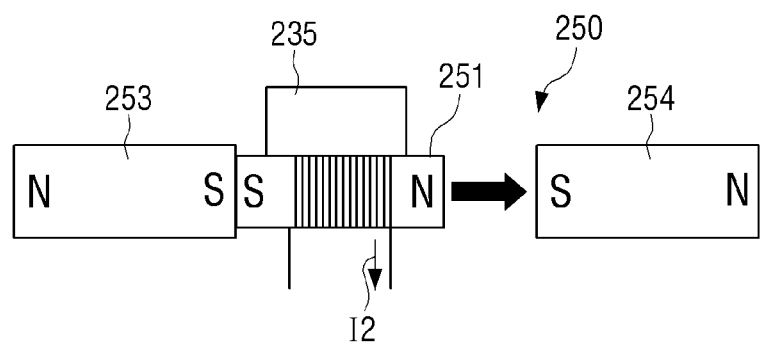
FIG. 6B is a view schematically illustrating a driving unit to drive the locking member as illustrated in FIG. 4A when the driving unit moves the locking member from a first position (a locking position) to a second position (an unlocking position)

Referring to FIGS. 6A and 6B, the locking member driving unit 250 may include an electromagnet 251, a first permanent magnet 253, and a second permanent magnet 254.

The electromagnet 251 is coupled to an electromagnet connecting portion 235 (see FIG. 4A) of the locking member 230. As illustrated in FIG. 4A, for example, the electromagnet connecting portion 235 may be formed integrally with the body portion 231 in a bottom surface of the body portion 231 of the locking member 230.

The first permanent magnet 253 is implemented as a bar magnet, and is disposed so that an S pole of the first permanent magnet 253 faces one end (a left end) of the electromagnet 251 as illustrated in FIG. 6A. The second permanent magnet 254 also is implemented as a bar magnet, and is disposed so that an S pole of the second permanent magnet 254 faces the other end (a right end) of the electromagnet 251 as illustrated in FIG. 6B. In other words, the first permanent magnet 253 and the second permanent magnet 254 are arranged so that the S poles thereof face each other, and the electromagnet 251 is arranged between the first and second permanent magnets 253 and 254.

In the present embodiment, the S pole of the first permanent magnet 253 and the S pole of the second permanent magnet 254 are arranged to face the opposite ends of the electromagnet 251. Alternatively, an N pole of the first permanent magnet 253 and an N pole of the second permanent magnet 254 may be arranged to face the opposite ends of the electromagnet 251.

When the electromagnet 251 is attached to the second permanent magnet 254 as illustrated in FIG. 6A, the locking member 230 that is coupled to the electromagnet 251 is placed in the second position (the unlocking position) as illustrated in FIG. 4B. In contrast, when the electromagnet 251 is attached to the first permanent magnet 253 as illustrated in FIG. 6B, the locking member 230 that is coupled to the electromagnet 251 is placed in the first position (the locking position) as illustrated in FIG. 4A.

Referring to FIG. 6A, if a forward current I1 is supplied to the electromagnet 251, the right end of the electromagnet 251 becomes the S pole, and the left end of the electromagnet 251 becomes the N pole so that the electromagnet 251 is moved from the second permanent magnet 254 to the first permanent magnet 253 by a magnetic force that is provided by the permanent magnets 253 and 254, and thus is attached to the first permanent magnet 253. Accordingly, the locking member 230 coupled to the electromagnet 251 is moved from the second position (unlocking position) to the first position (the locking position).

Referring to FIG. 6B, if a reverse current I2 is supplied to the electromagnet 251, the right end of the electromagnet 251 becomes the N pole, and the left end of the electromagnet 251 becomes the S pole so that the electromagnet 251 is moved from the first permanent magnet 253 to the second permanent magnet 254 by the magnetic force that is provided by the permanent magnets 253 and 254, and thus is attached to the second permanent magnet 254. Accordingly, the locking member 230 coupled to the electromagnet 251 is moved from the first position (the locking position) to the second position (the unlocking position).

The controller 260 controls a position of the locking member 230 by supplying or blocking current to the electromagnet 251 based on the signals S1 and S2 that are provided by the first and second signal generating members 240 and 211a.

A position control of the controller 260 will be described in detail with reference to FIGS. 7, 8A, 8B, 8C, 9A, 9B, and 9C.

Figure 7:
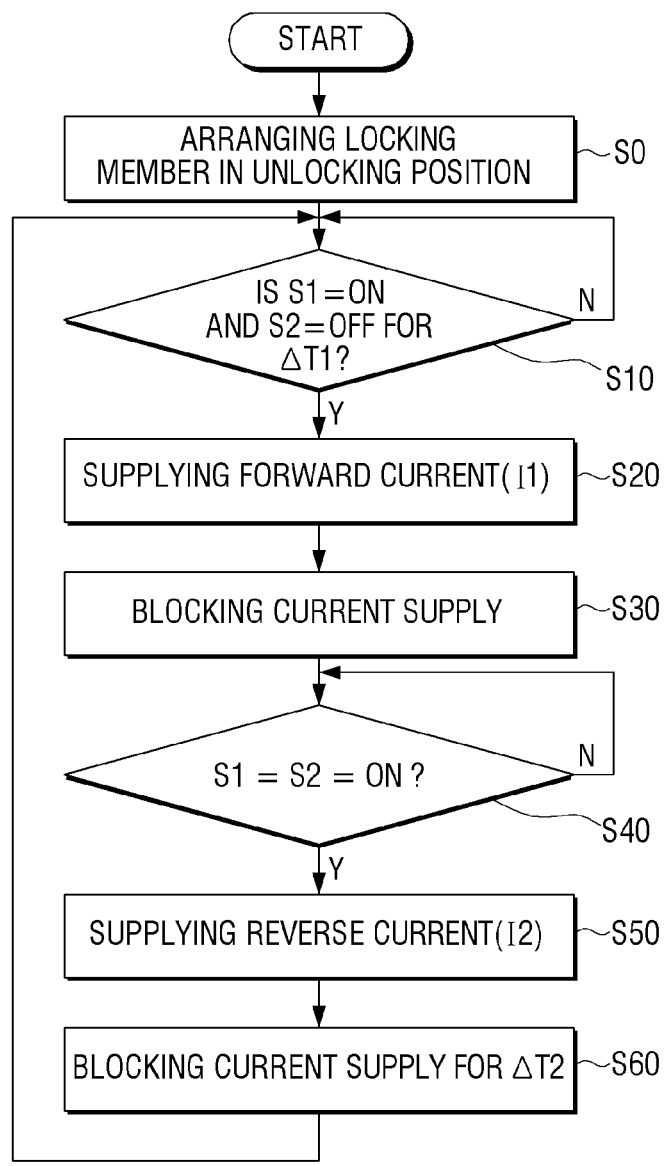
FIG. 7 is a flowchart illustrating a method in which a controller controls a position of a locking member.
Figure 8A:
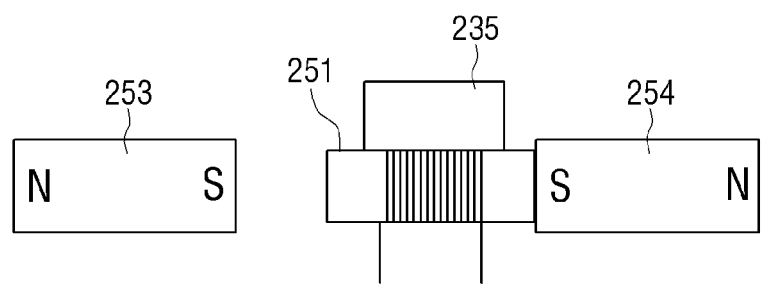
FIGS. 8A to 8C are views sequentially illustrating a process in which a position of a locking member changes from an unlocking position (a second position) to a locking position (a first position)
Figure 8B:
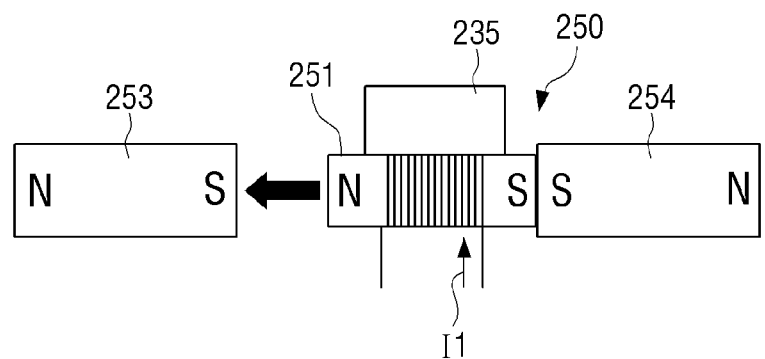
Figure 8C:
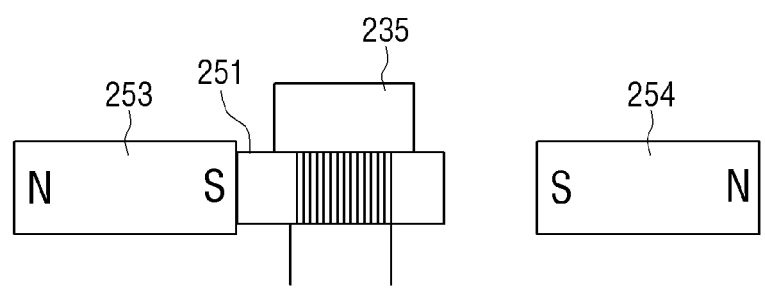
Figure 9A:
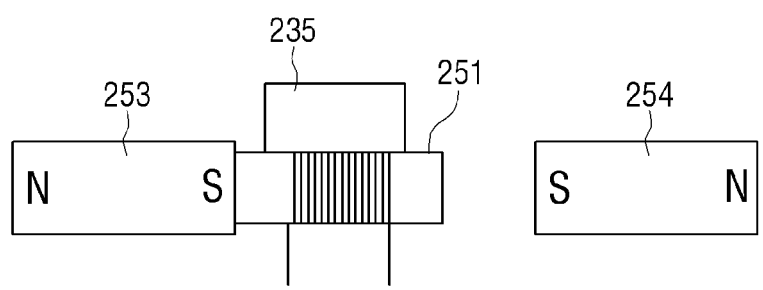
FIGS. 9A to 9C are views sequentially illustrating a process in which a position of a locking member changes from a locking position (a first position) to an unlocking position (a second position).
Figure 9B:
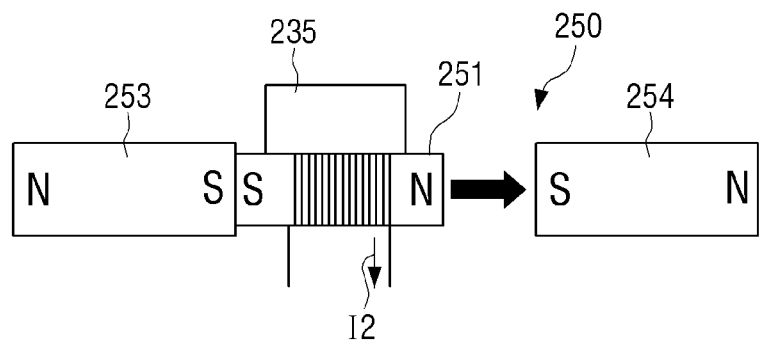
Figure 9C:
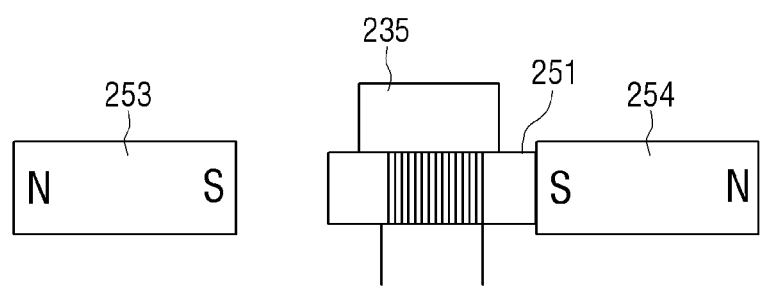

FIG. 7 is a flowchart illustrating a method of controlling a position of a locking member according to an embodiment of the present general inventive concept. FIGS. 8A to 8C are views sequentially illustrating a process to change a position of a locking member from an unlocking position (a second position) to a locking position (a first position). FIGS. 9A to 9C are views sequentially illustrating a process to change a position of a locking member from a locking position (a first position) to a locking position (a second position).

First, when the portable electronic device 100 is being docked to the docking apparatus 200, a process is performed to change the position of the locking member 230 from the unlocking position (the second position) to the locking position (the first position).

The docking apparatus 200 may be set to perform an initial operation S0 according to a user or design preference. As illustrated in FIG. 8A, in the initial operation S0, the electromagnet 251 is attached to the second permanent magnet 254 so that the locking member 230 remains in the second position (the unlocking position).

In an operation S10, the controller 260 determines whether a state in which the locking signal S1 is generated from the first signal generating member 240 (see FIG. 3) and the unlocking signal S2 is not generated from the second signal generating member 211a (see FIG. 3) persists for at least a predetermined first reference time ΔT1. In other words, in the operation S10, the controller 260 determines whether a condition (a locking condition) in which the locking signal S1 is received and the unlocking signal S2 is not received, namely, S1=ON and S2=OFF has been met for the at least first reference time ΔT1. For example, the first reference time ΔT1 may be set to one second.

If a state in which the portable electronic device 100 is not docked persists, the first signal generating member 240 (see FIG. 3) does not generate the locking signal S1 (namely, S1=OFF) so that the first condition is not satisfied. Accordingly, the controller 260 repeatedly performs the operation S10 or maintains the unlocking position.

If the portable electronic device 100 is docked so that the first signal generating member 240 is generating the locking signal S1 for the at least first reference time ΔT1, the locking condition is satisfied so that controller 260 executes an operation S20.

If the user separates the portable electronic device 100 from the docking apparatus 200 as soon as the portable electronic device 100 is disposed on the docking apparatus 200, a duration time of a state of S1=ON is smaller than the first reference time ΔT1 and thus the operation S20 is not executed.

As illustrated in FIG. 8B, in the operation S20, a forward current I1 is supplied to the electromagnet 251 according to the control of the controller 260. Accordingly, the electromagnet 251 is moved by the magnetic force from the second permanent magnet 254 to the first permanent magnet 253 so that the locking member 230 coupled to the electromagnet 251 is moved from the second position (the unlocking position) to the first position (the locking position).

After the operation S20 is completed, the controller 260 performs an operation S30. As illustrated in FIG. 8C, in the operation S30, the controller 260 blocks the current supply to the electromagnet 251. Nevertheless, as illustrated in FIG. 8C, the electromagnet 251 keeps a state in which the electromagnet 251 is attached to the first permanent magnet 253 by the magnetic attraction, and therefore the locking member 230 coupled to the electromagnet 251 is maintained in the first position (the locking position).

From the above description, it may be understood that, when the portable electronic device 100 is docked to the docking apparatus 200, the first signal generating member 240 detects the docking of the portable electronic device 100 and automatically generates the locking signal S1 so that the locking of the locking member 230 is also performed by only the docking operation of the user. With the docking apparatus 200 according to the present embodiment, it also may be understood that the docking and locking of the portable electronic device 100 can be performed by using only one hand in one operation.

Next, when the portable electronic device 100 is removed from the docking apparatus 200, a process in which the position of the locking member 230 is changed from the locking position (the first position) to the unlocking position (the second position) is described.

If a state in which the portable electronic device 100 is docked to the docking apparatus 200 is continued, the electromagnet 251 is maintained in a state in which the electromagnet 251 is attached to the first permanent magnet 253 as illustrated in FIG. 9A so that the locking member 230 is maintained in the first position (the locking position). In this case, the portable electronic device 100 presses the first signal generating member 240 within the docking groove 221 (see FIG. 3) so that the first signal generating member 240 continuously generates the locking signal S1. In other words, a state of S1=ON persists.

The controller 260 determines whether a condition (an unlocking condition) in which both the locking signal S1 and the unlocking signal S2 are received, namely, S1=S2=ON is satisfied at operation S40. In other words, in the operation S40, the controller 260 determines whether a condition of S1=ON and S2=ON is satisfied.

When the user manipulates the second signal generating member 211a provided in the docking apparatus 200 to be operated in order to remove the portable electronic device 100 from the docking apparatus 200, the unlocking signal S2 is generated so that the unlocking condition (S1=ON and S2=ON) is satisfied for the first time.

Then, the controller 260 performs an operation S50. As illustrated in FIG. 9B, in the operation S50, a reverse current I2 is supplied to the electromagnet 251 according to the control of the controller 260. Accordingly, the electromagnet 251 is moved from the first permanent magnet 253 to the second permanent magnet 254 so that the locking member 230 coupled to the electromagnet 251 is moved from the first position (the locking position) to the second position (the unlocking position).

After the operation S50 is completed, the controller 260 performs an operation S60. As illustrated in FIG. 9C, in the operation S60, the controller 260 blocks the current supply to the electromagnet 251. Nevertheless, as illustrated in FIG. 9C, the electromagnet 251 keeps a state in which the electromagnet 251 is attached to the second permanent magnet 254 by the magnetic attraction, and therefore the locking member 230 coupled to the electromagnet 251 is maintained in the second position (the unlocking position).

The operation S60 persists for a predetermined second reference time ΔT2. Here, it may be understood that, when the locking member 230 is moved from the first position (the locking position) to the second position (the unlocking position), the locking member 230 is maintained in the second position (the unlocking position) during at least the second reference time ΔT2. For example, the second reference time ΔT2 may be set to two seconds.

When the locking member 230 is maintained in the second position (the unlocking position), the user may remove the portable electronic device 100 from the docking apparatus 200 using one hand.

However, if the user does not separate the portable electronic device 100 from the docking apparatus 200 within the second reference time ΔT2, since the locking condition (S1=ON and S2=OFF) is satisfied, the operations S10, S20, and S30 as described above sequentially proceed so that the locking member 230 is returned to the first position (the locking position). Accordingly, if the user wants to remove the portable electronic device 100 from the docking apparatus 200, the user should re-operate the second signal generating member 211a.

From the above description, it may be understood that, after the user touches the second signal generating member 211a so that the locking member 230 is moved from the first position (the locking position) to the second position (the unlocking position), the user can remove the portable electronic device 100 from the docking apparatus 200 within the aforementioned second reference time ΔT2. With the docking apparatus 200 according to the present embodiment, it also may be understood that the user can perform unlocking and undocking of the portable electronic device 100 by using only one hand in two-steps. In other words, with the docking apparatus 200 according to the present embodiment, the portable electronic device 100 may be removed from the docking apparatus 200 by one-hand and two-steps. Accordingly, the docking apparatus 200 according to the present embodiment is more convenient than a conventional docking apparatus in which a user can separate the portable electronic device from the docking apparatus in a manner that one hand of the user removes the portable electronic device from the docking apparatus while the other hand of the user presses an unlocking button.

It is possible that if the second signal generating member 211a is provided in the form of a touch sensor in the portable electronic device 100, an operation to press the second signal generating member 211a as described above is not necessary so that the portable electronic device 100 may be separated from the docking apparatus 200 by one-hand and one-operation.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. Docking apparatus usable with a portable electronic device, the docking apparatus comprising: a locking member configured to be moved between a first position to lock the portable electronic device docked to the docking apparatus and a second position to release the locking of the portable electronic device; a locking member driving unit configured to drive the locking member, wherein the locking member driving unit comprises: an electromagnet coupled to the locking member; a first permanent magnet disposed so that a first pole of the first permanent magnet faces one end of the electromagnet; and a second permanent magnet disposed so that a second pole of the second permanent magnet faces a second end of the electromagnet, wherein the pole of the first permanent magnet facing the one end of the electromagnet and the pole of the second permanent magnet facing the second end of the electromagnet have the same polarity; and a controller configured to control the locking member driving unit so that, if an unlocking condition is satisfied in a state in which the portable electronic device is docked to the docking apparatus, the locking member is moved from the first position to the second position and then the locking member is maintained in the second position for at least a predetermined time.

2. The docking apparatus of claim 1, wherein the controller controls the locking member driving unit so that, if a locking condition is satisfied more than the predetermined time in a state in which the portable electronic device is docked to the docking apparatus, the locking member is moved from the second position to the first position.

3. The docking apparatus of claim 2, further comprising:
a first signal generating member configured to generate a locking signal by detecting docking of the portable electronic device; and
a second signal generating member configured to generate an unlocking signal by detecting an operation of a user or a touch of the user,
wherein, if both the locking signal and the unlocking signal are received, the unlocking condition is satisfied, and, if the locking signal is received but the unlocking signal is not received, the locking condition is satisfied.

4. The docking apparatus of claim 1, wherein, when the electromagnet is attached to the first permanent magnet, the locking member is placed in the first position, and when the electromagnet is attached to the second permanent magnet, the locking member is placed in the second position.

5. The docking apparatus of claim 4, wherein, when a forward current flows, the electromagnet is moved from the second permanent magnet to the first permanent magnet, and when a reverse current flows, the electromagnet is moved from the first permanent magnet to the second permanent magnet.

6. The docking apparatus of claim 5, wherein, after movement of the electromagnet is completed, the controller blocks a current supply to the electromagnet.

7. The docking apparatus of claim 1, wherein the first signal generating member comprises a button switch that is operated by pressure of the portable electronic device to be docked or an approach detection sensor to detect approach of the portable electronic device to be docked.

8. The docking apparatus of claim 1, wherein the second signal generating member comprises a button switch that is operated by manipulation of a user or a touch sensor to detect a touch of the user.

9. The docking apparatus of claim 1, wherein the docking apparatus comprises:
a main body having a plurality of input keys; and
a docking unit connected to a top end portion of the main body and comprising a docking groove in which a bottom end of the portable electronic device is inserted.

10. The docking apparatus of claim 9, wherein the first signal generating member is provided in the docking groove, and the second signal generating member is provided in the main body.

11. The docking apparatus of claim 10, wherein one of the plurality of input keys is used as the second signal generating member.

12. The docking apparatus of claim 9, wherein the docking unit is rotatably connected to the main body.

13. The docking apparatus of claim 9, wherein the locking member and the locking member driving unit are disposed in the docking unit.

14. The docking apparatus of claim 13, wherein the locking member comprises,
a body portion slidably disposed within the docking unit; and at least one locking protrusion vertically extending from the body portion.

15. The docking apparatus of claim 13, wherein the docking unit comprises a pushing member insert hole formed thereon such that the pushing member configured to push the locking member from the first position to the second position is inserted from an outside through the pushing member insert hole.

16. A docking unit usable with a portable electronic device, comprising: a locking member disposed to lock and unlock the portable electronic device; a first signal generating member to generate a first signal according to a movement of the portable electronic device with respect to the locking unit; and a locking member driving unit connected to the locking member to drive the locking member to a locking position according to the first signal of the first signal generating member, and to drive the locking member to an unlocking position according to a manipulation of an external member, wherein the locking member driving unit comprises: an electromagnet coupled to the locking member; a first permanent magnet disposed so that a first pole of the first permanent magnet faces one end of the electromagnet; and a second permanent magnet disposed so that a second pole of the second permanent magnet faces a second end of the electromagnet, wherein the pole of the first permanent magnet facing the one end of the electromagnet and the pole of the second permanent magnet facing the second end of the electromagnet have the same polarity; and a controller configured to control the locking member driving unit so that, if an unlocking condition is satisfied in a state in which the portable electronic device is docked to the docking apparatus, the locking member is moved from the first position to the second position and then the locking member is maintained in the second position for at least a predetermined time.

17. The docking unit of claim 16, wherein the external member comprises one of:
a mechanical member usable to move the locking member when a power is not supplied to the locking member driving unit; and
an electrical member usable to move the locking member when a power is supplied to the locking member driving unit.

18. The docking unit of claim 16, wherein the locking member driving unit comprises a portion connected to the locking member such that the locking member and the portion of the locking member driving unit move together between the locking position and the unlocking position.

19. The docking unit of claim 16, further comprising:
a housing to accommodate the locking member and the first signal generating member between upper and lower sides thereof, the housing including a plurality of openings formed on the upper side to expose protrusions of the locking member and the first signal generating member toward the portable electronic device to be disposed on the upper side.

20. The docking unit of claim 19, wherein the upper side of the housing has a shape to correspond to a lower side and a corner side of the portable electronic device.

21. A docking apparatus usable with a portable electronic device, comprising: a main body having one or more input keys; and a docking unit having a portion connected to the main body, and another portion rotatably connected to the portion, the another portion comprising: a locking member disposed to lock and unlock the portable electronic device; a first signal generating member to generate a first signal according to a movement of the portable electronic device with respect to the locking unit; and a locking member driving unit connected to the locking member to drive the locking member to an locking position according to the first signal of the first signal generating member, and to drive the locking member to an unlocking position according to a manipulation of an external member disposed on one of the main body, the docking unit, and the portable electronic device, wherein the locking member driving unit comprises: an electromagnet coupled to the locking member; a first permanent magnet disposed so that a first pole of the first permanent magnet faces one end of the electromagnet; and a second permanent magnet disposed so that a second pole of the second permanent magnet faces a second end of the electromagnet, wherein the pole of the first permanent magnet facing the one end of the electromagnet and the pole of the second permanent magnet facing the second end of the electromagnet have the same polarity; and a controller configured to control the locking member driving unit so that, if an unlocking condition is satisfied in a state in which the portable electronic device is docked to the docking apparatus, the locking member is moved from the first position to the second position and then the locking member is maintained in the second position for at least a predetermined time.

\* \* \* \* \*